Aug. 21, 1951  J. HALAHAN ET AL  2,565,074
PHOTOGRAPHIC COPYING APPARATUS
Filed Feb. 26, 1947  14 Sheets-Sheet 1
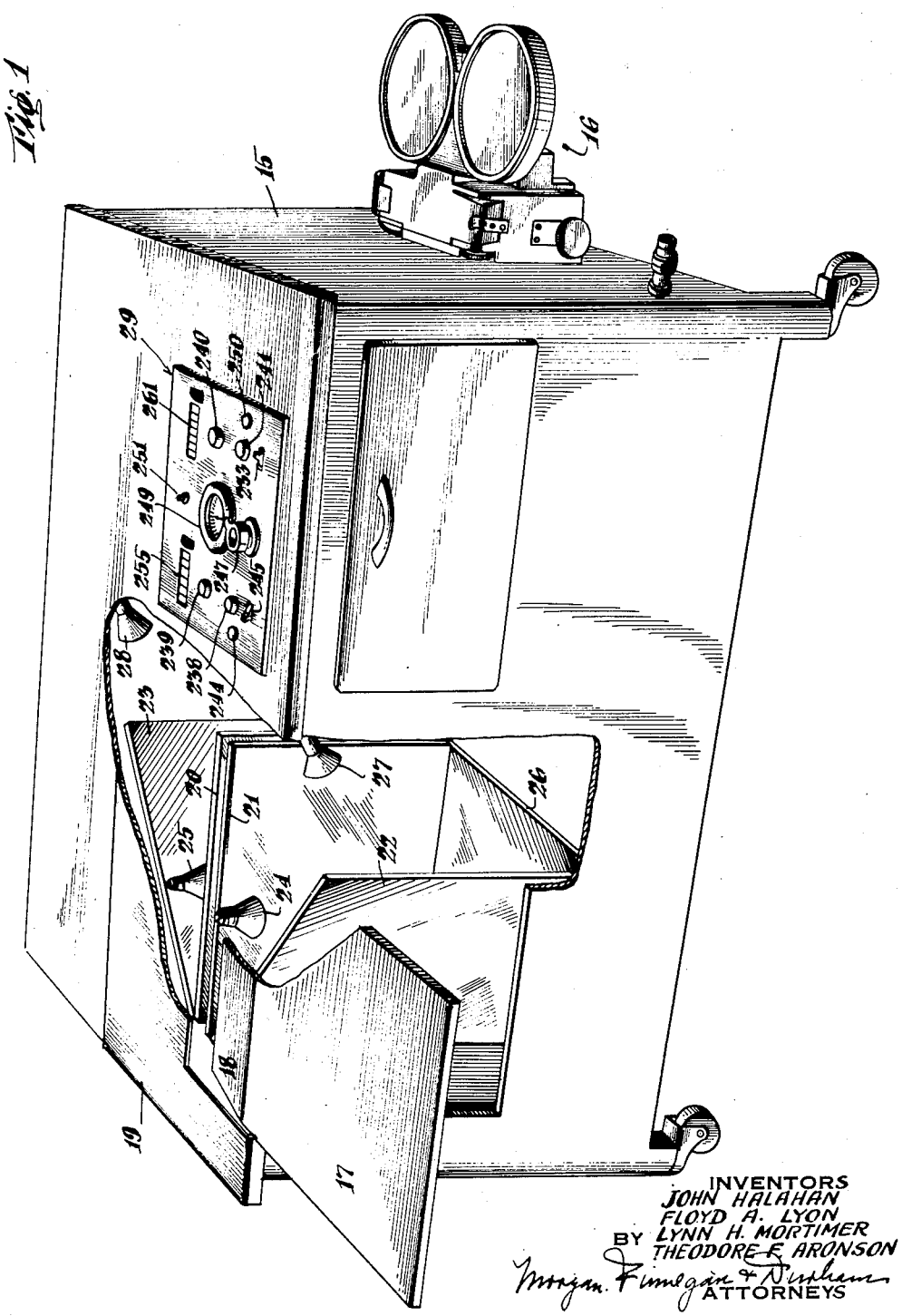
INVENTORS
JOHN HALAHAN
FLOYD A. LYON
BY LYNN H. MORTIMER
THEODORE F. ARONSON
Morgan, Finnegan & Durham
ATTORNEYS Aug. 21, 1951  J. HALAHAN ET AL  2,565,074
PHOTOGRAPHIC COPYING APPARATUS
Filed Feb. 26, 1947  14 Sheets-Sheet 2

INVENTORS
JOHN HALAHAN
FLOYD A. LYON
LYNN H. MORTIMER
THEODORE F. ARONSON
BY Morgan, Finnegan & Durham
ATTORNEYS Aug. 21, 1951   J. HALAHAN ET AL   2,565,074
PHOTOGRAPHIC COPYING APPARATUS
Filed Feb. 26, 1947   14 Sheets-Sheet 3
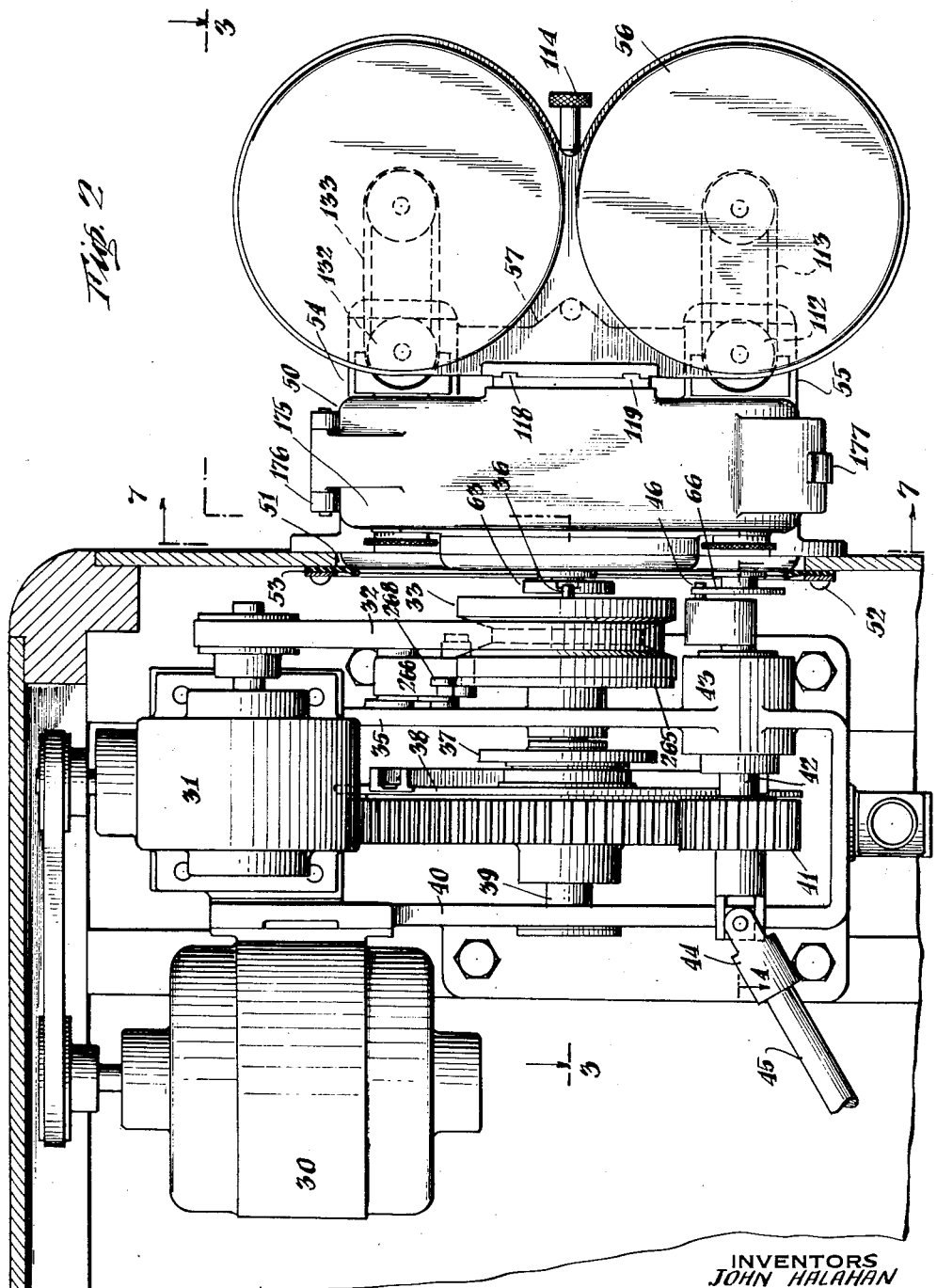
INVENTORS
JOHN HALAHAN
FLOYD A. LYON
BY LYNN H. MORTIMER
THEODORE F. ARONSON
Morgan, Finnegan & Durham
ATTORNEYS

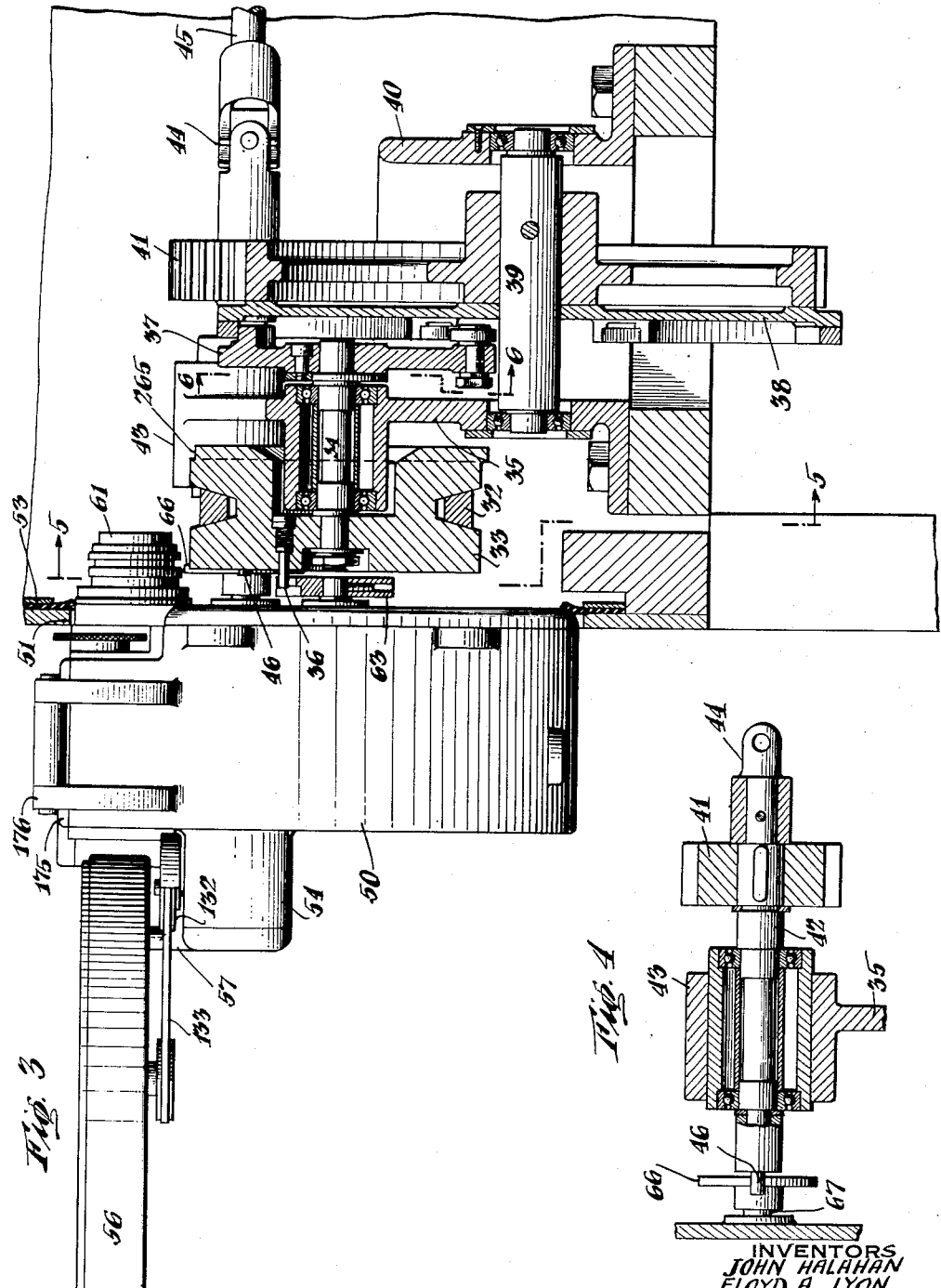

Aug. 21, 1951     J. HALAHAN ET AL     2,565,074
PHOTOGRAPHIC COPYING APPARATUS
Filed Feb. 26, 1947     14 Sheets-Sheet 5
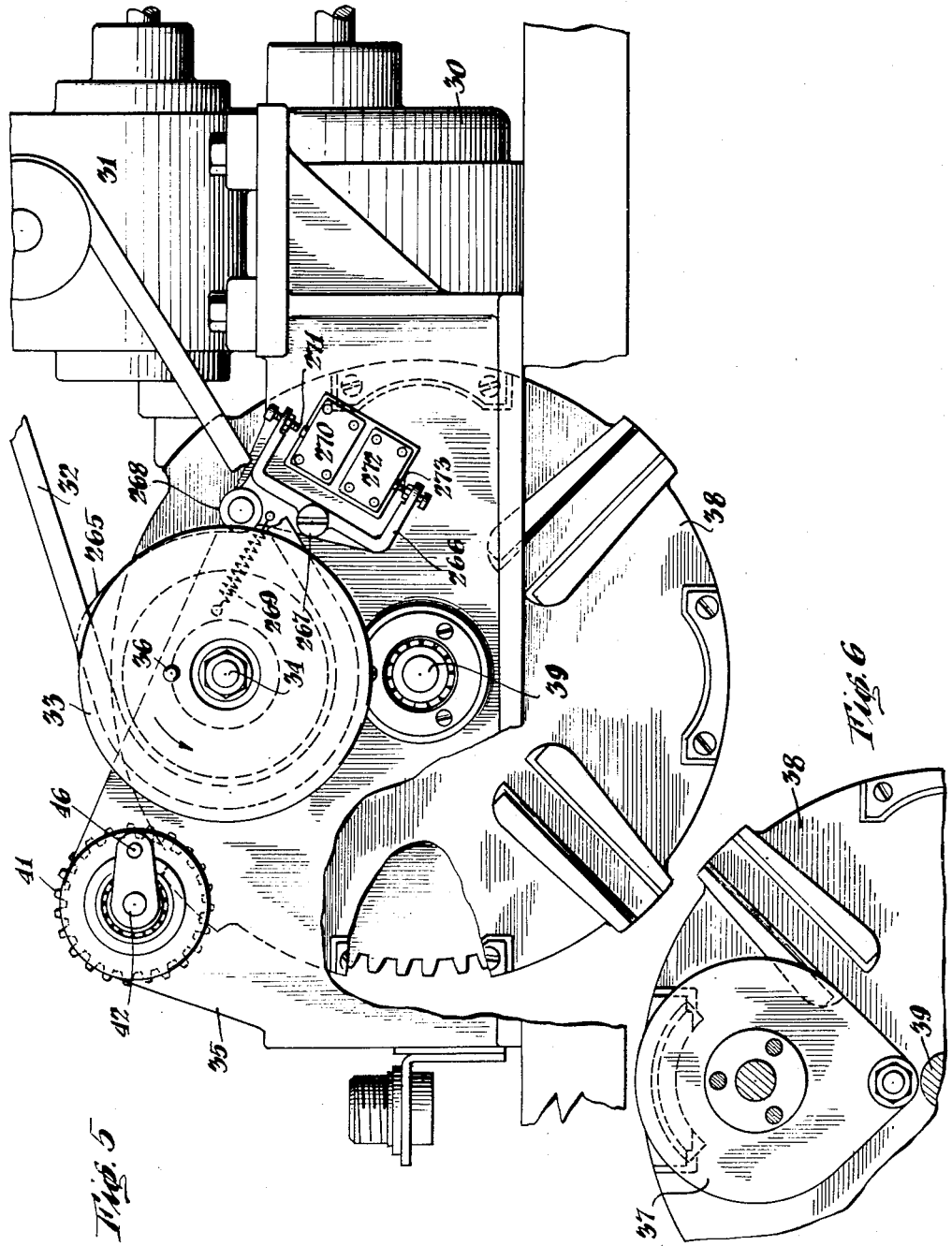
INVENTORS
JOHN HALAHAN
FLOYD A. LYON
LYNN H. MORTIMER
THEODORE F. ARONSON
BY
ATTORNEYS

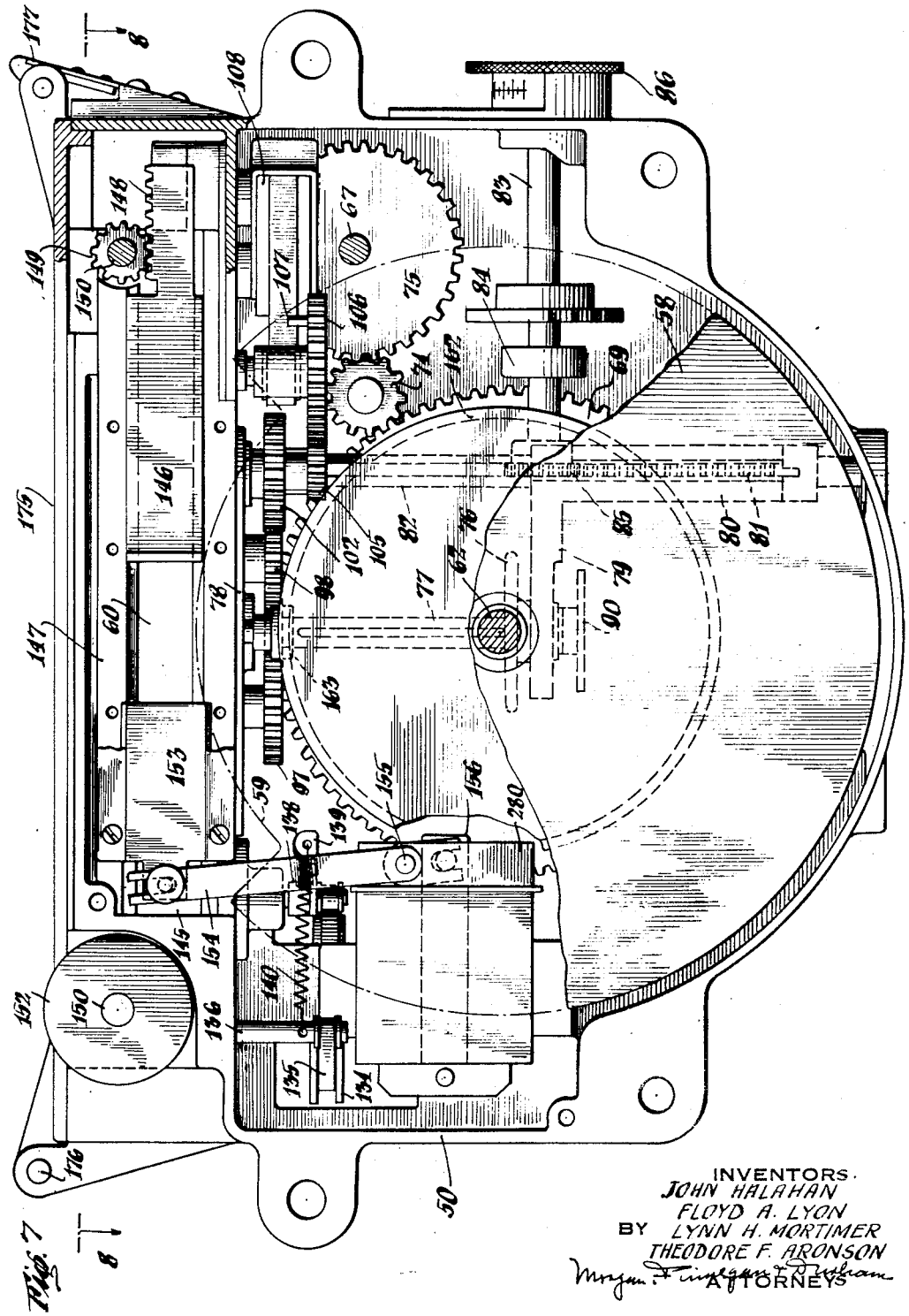

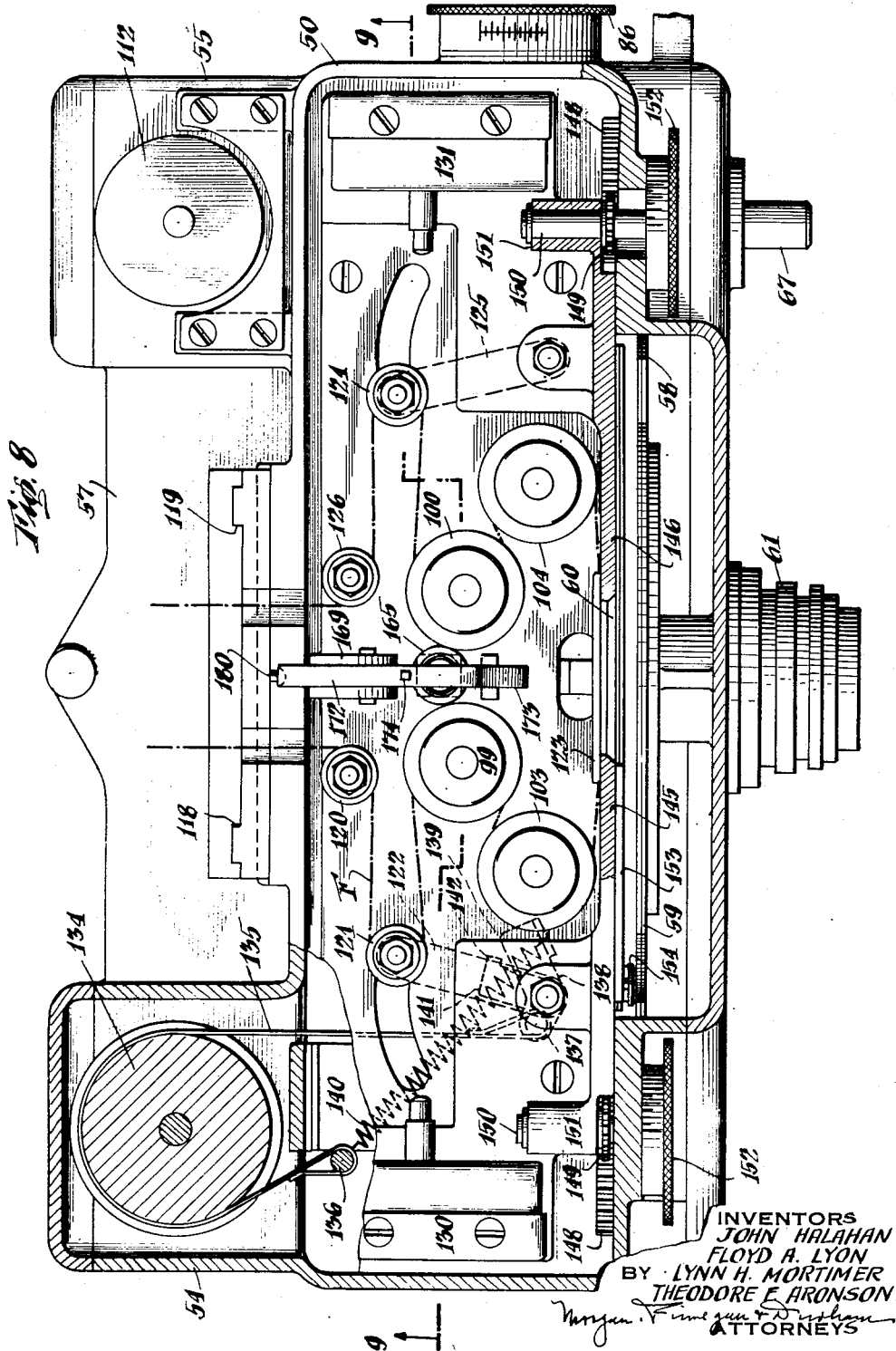

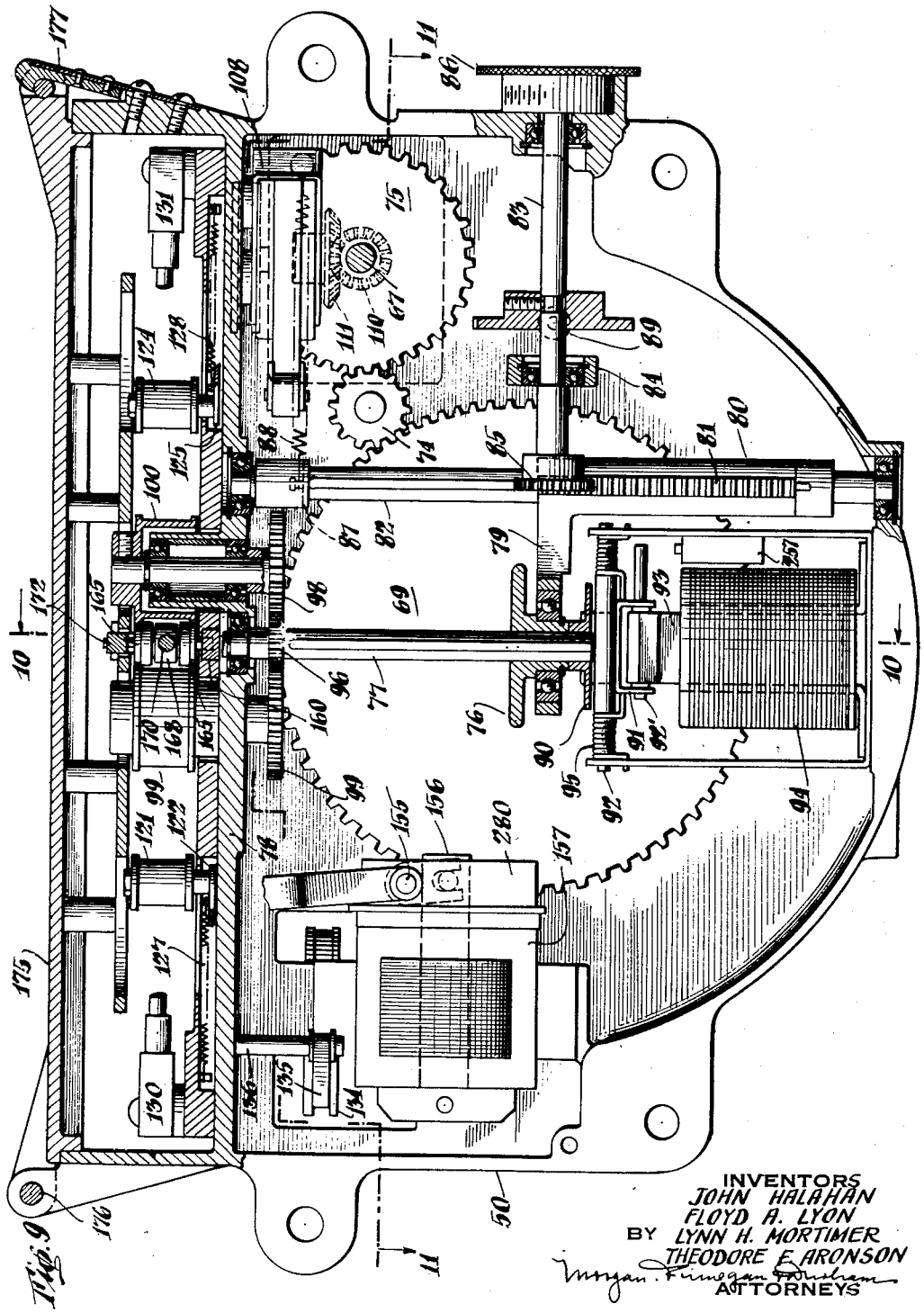

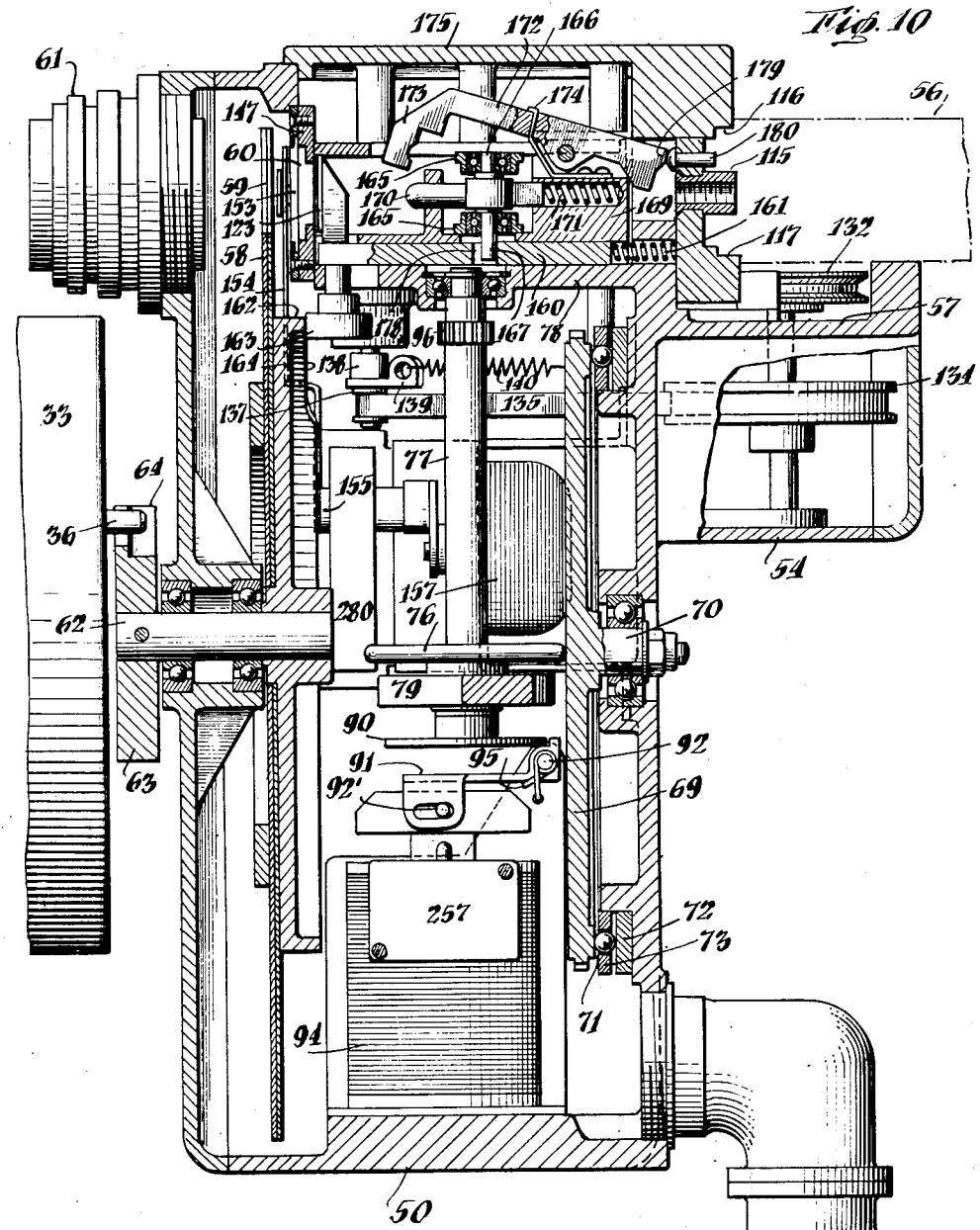

Aug. 21, 1951  J. HALAHAN ET AL  2,565,074
PHOTOGRAPHIC COPYING APPARATUS
Filed Feb. 26, 1947  14 Sheets-Sheet 10
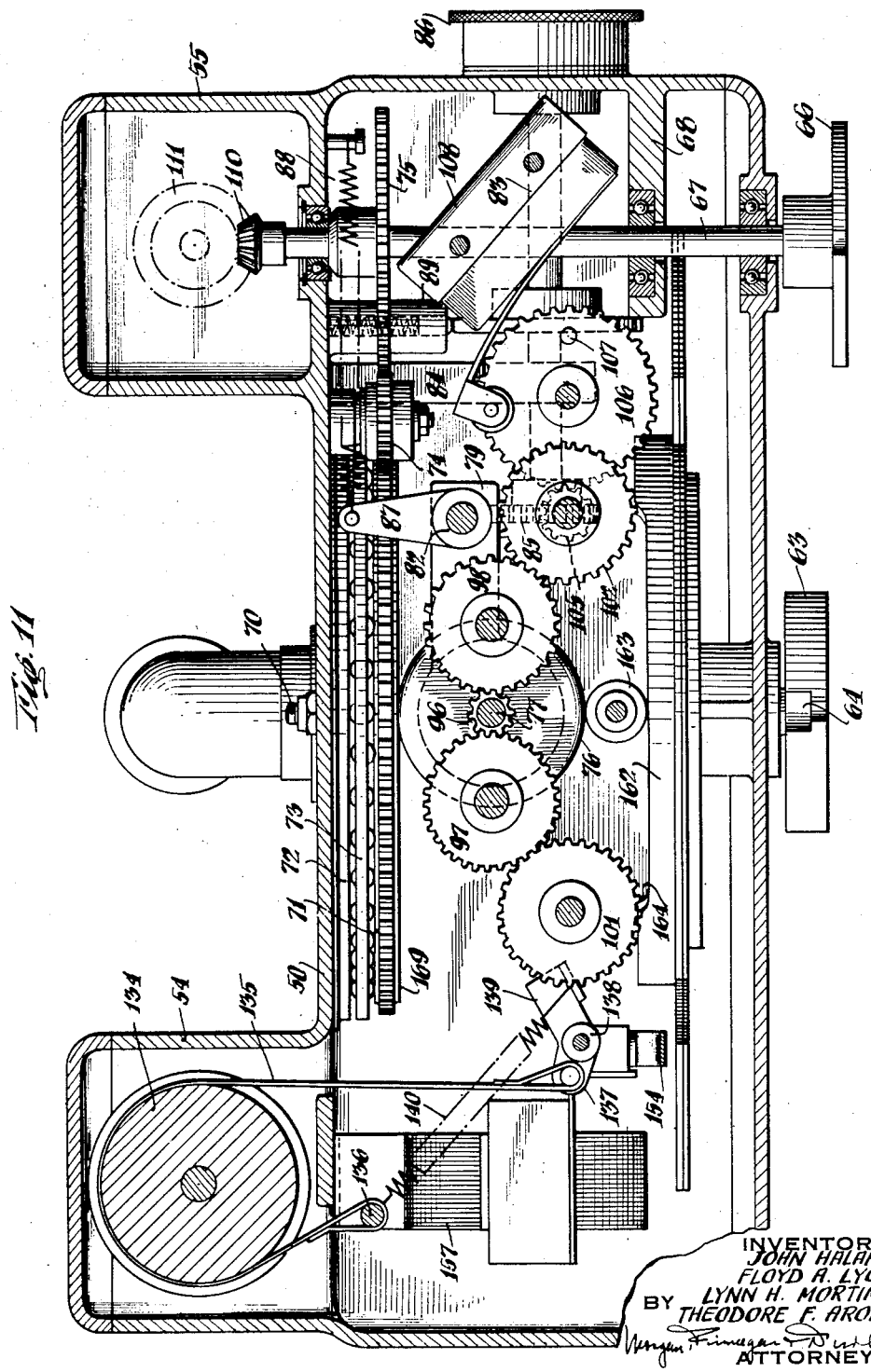
INVENTORS
JOHN HALAHAN
FLOYD A. LYON
LYNN H. MORTIMER
THEODORE F. ARONSON
BY
ATTORNEYS

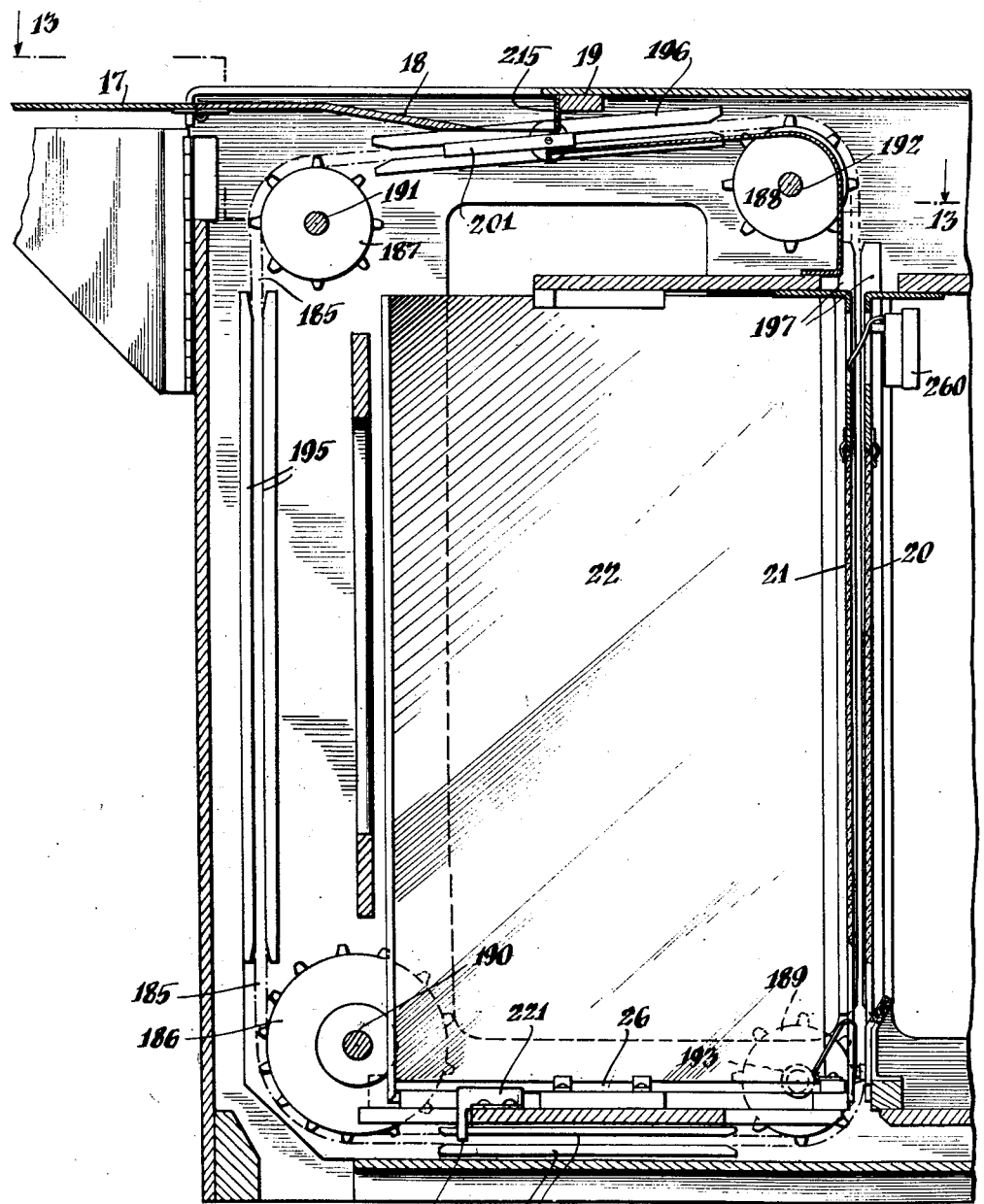

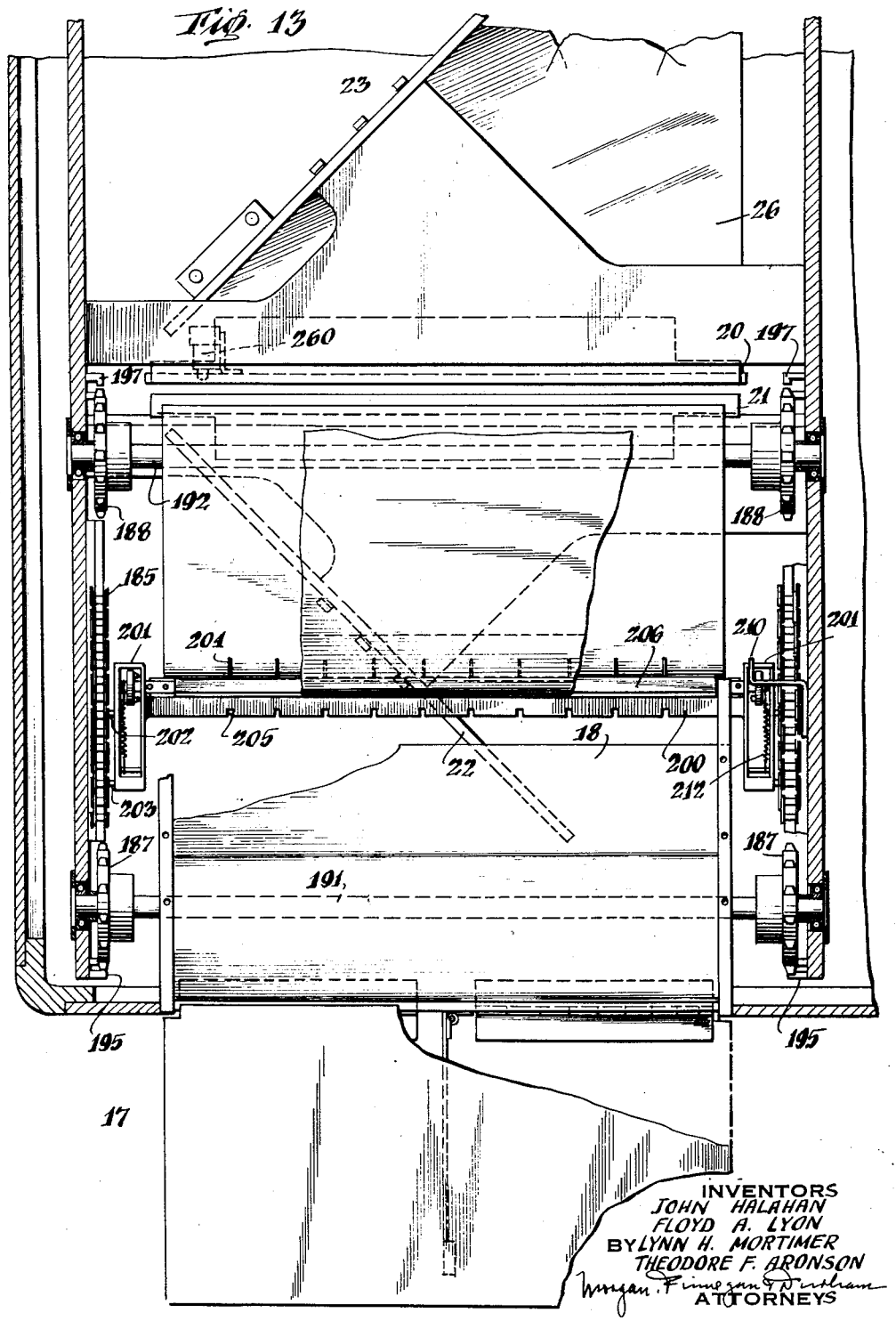

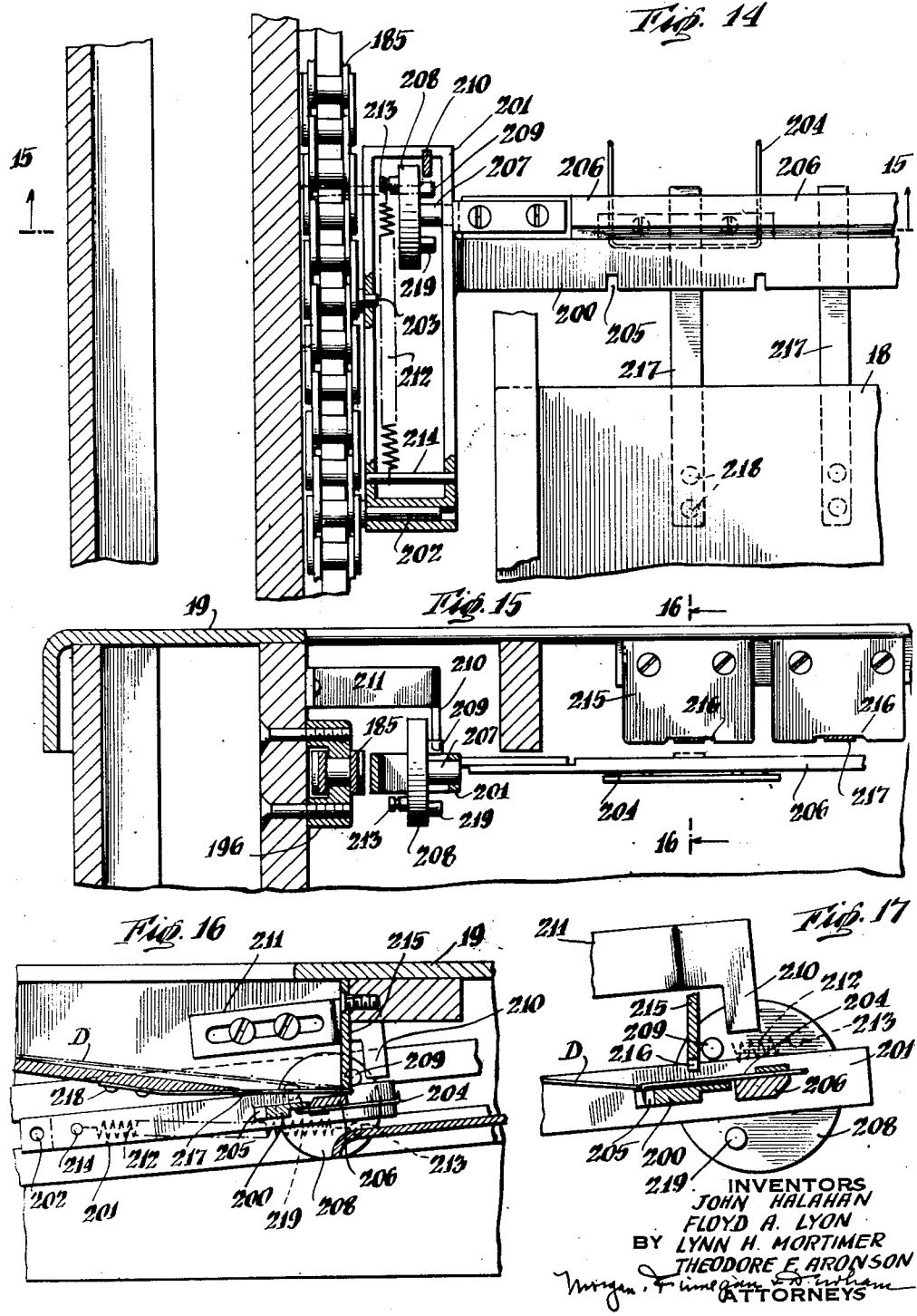

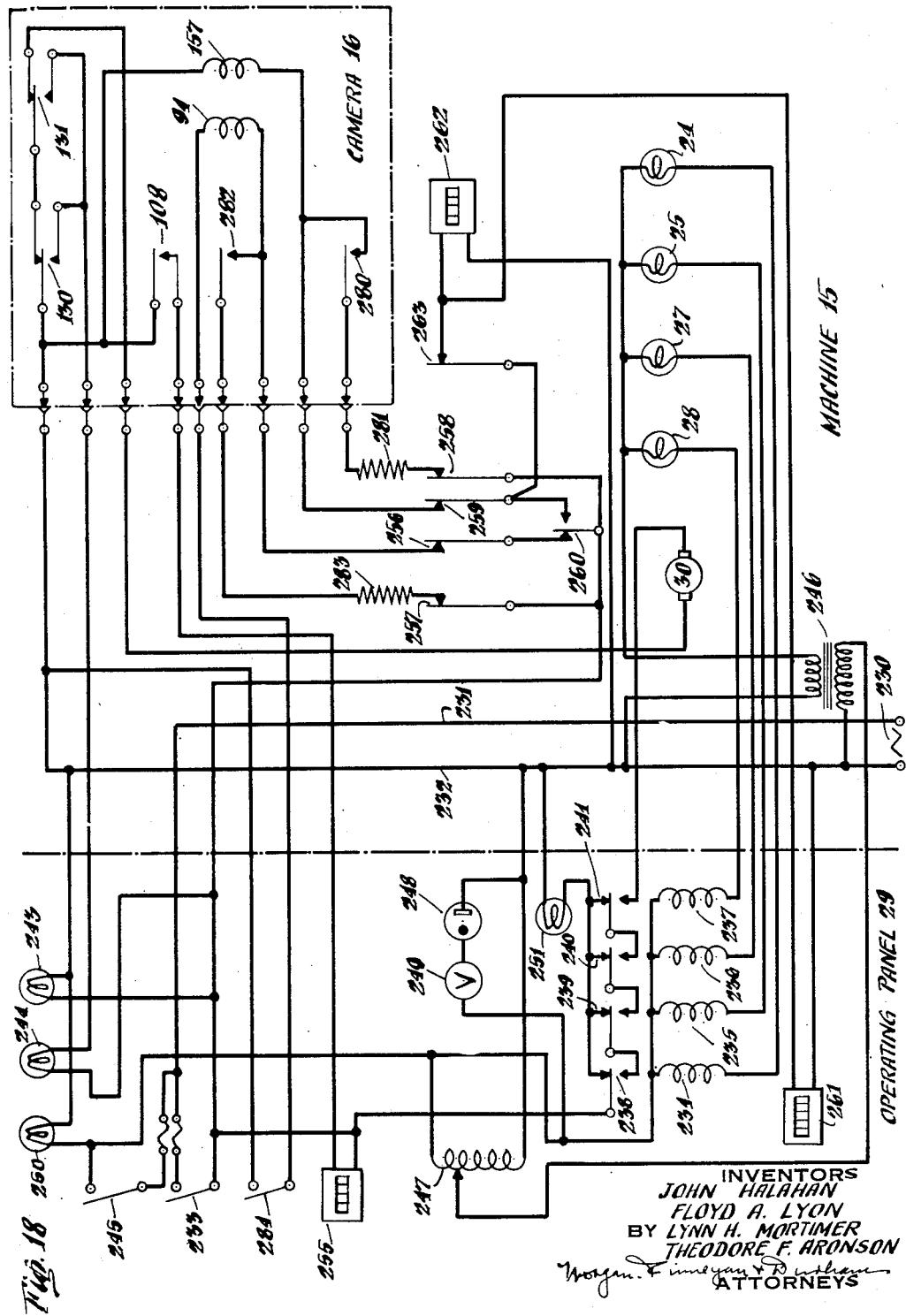

Patented Aug. 21, 1951

2,565,074

UNITED STATES PATENT OFFICE 2,565,074

PHOTOGRAPHIC COPYING APPARATUS

John Halahan, Jackson Heights, and Floyd A. Lyon, Hillside Heights, N. Y., Lynn H. Mortimer, Caldwell, N. J., and Theodore F. Aronson, St. Albans, N. Y., assignors to Holbrook Microfilming Service, Inc., New York, N. Y., a corporation of Delaware Application February 26, 1947, Serial No. 730,894

6 Claims. (Cl. 88—24)

The present invention relates to photographic copying apparatus and more particularly to such apparatus adapted to the copying of documents on photographic film in miniature scale to provide a permanent record which occupies a minimum space.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawings, referred to herein and constituting a part hereof, illustrate one embodiment of the invention, and together with the description, serve to explain the principles of the invention.

Of the drawings:

Fig. 1 is a perspective view of a photographic document copying apparatus embodying the present invention, certain parts of the cabinet being broken away to disclose the parts within;

Fig. 2 is a detail view on an enlarged scale of the camera and conveying means driving mechanism shown in Fig. 1A;

Fig. 3 is a cross-sectional view taken along line 3—3 of Fig. 2;

Fig. 4 is a detail cross-sectional view taken along line 4—4 of Fig. 2;

Fig. 5 is a view of the main driving mechanism of the apparatus taken along line 5—5 of Fig. 3, certain parts being broken away to show the parts behind;

Fig. 6 is a detail cross-sectional view taken along line 6—6 of Fig. 3;

Fig. 7 is a view of the copying camera embodied in the apparatus of the invention as viewed along line 7—7 of Fig. 2;

Fig. 8 is a cross-sectional view of the copying camera taken along line 8—8 of Fig. 7;

Fig. 9 is a cross-sectional view of the camera taken along line 9—9 of Fig. 8;

Fig. 10 is a central vertical cross-sectional view of the camera taken along line 10—10 of Fig. 9;

Fig. 11 is a central vertical cross-sectional view of the camera taken along line 11—11 of Fig. 9;

Fig. 12 is a vertical cross-sectional view through the copying apparatus along the line 12—12 of Fig. 1A of the drawings showing certain of the details of the document conveying means of the invention;

Fig. 13 is a cross-sectional view taken along line 13—13 of Fig. 12;

Fig. 14 is a detail view on an enlarged scale of certain of the document conveying means shown in Fig. 13 disclosing the document engaging means on the conveyor;

Fig. 15 is a cross-sectional view taken along line 15—15 of Fig. 14;

Fig. 16 is a detail sectional view taken along line 16—16 of Fig. 15;

Fig. 17 is a detail sectional view similar to Fig. 16 but showing the document gripping means as actuated to engage and grip a document on the conveying means; and Fig. 18 is a wiring diagram of the control for the copying apparatus and the various indicating means embodied therein.

Figure 1A:
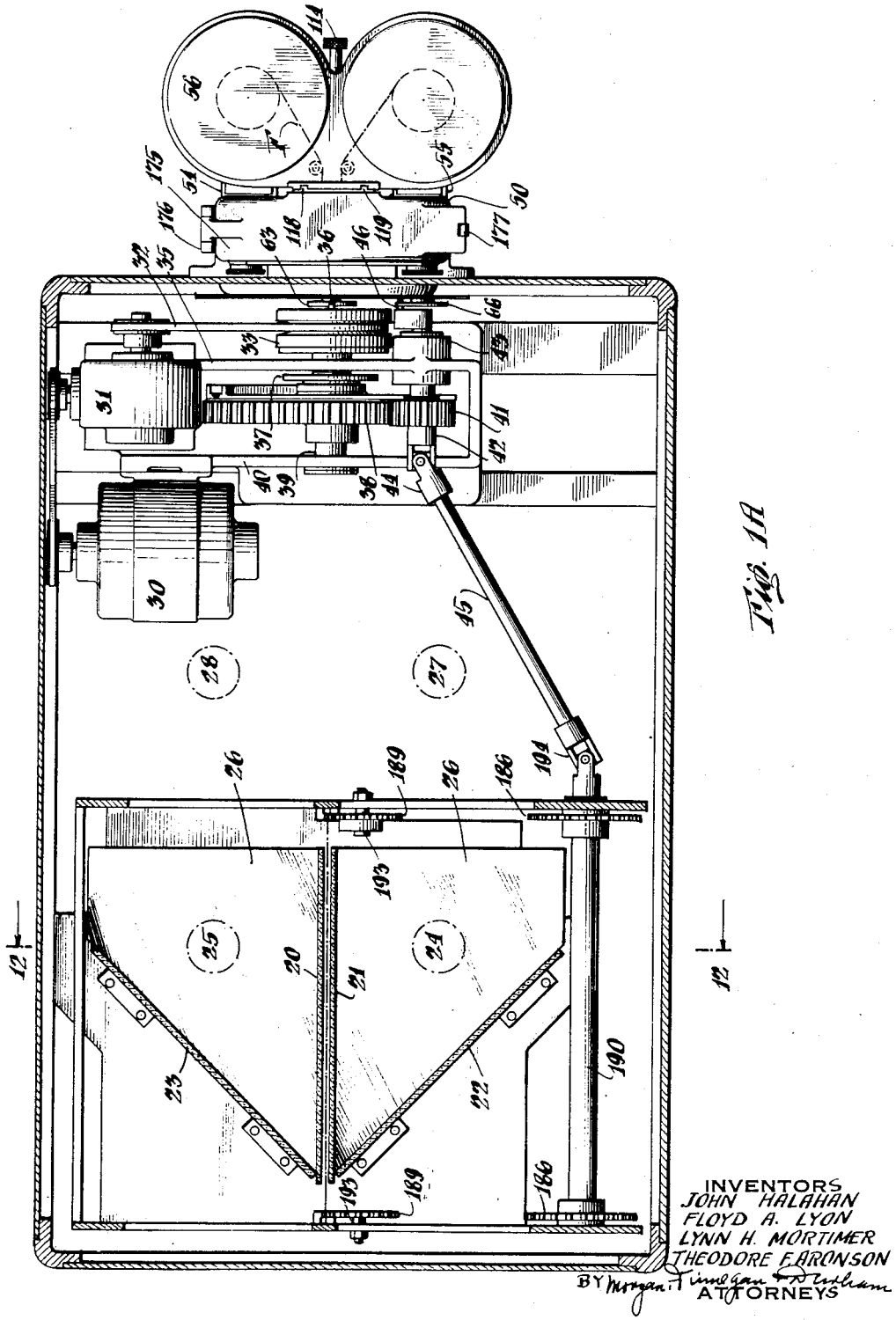
Fig. 1A is a horizontal cross sectional view taken along line 1A—1A of Fig. 1.

The present invention has for an object the provision of an improved photographic copying apparatus designed to copy documents or other material upon photographic film in greatly reduced scale, the apparatus being such as generally designated microfilming apparatus. A further object is the provision of such apparatus of the intermittent type, that is, microfilming apparatus in which the document conveying means and the copying camera are driven in intermittent or step-by-step motion, as distinguished from a continuous or flow type of device. The invention provides such an intermittent microfilming apparatus in which both sides of a document may be simultaneously copied or either side separately copied, in which an improved and more efficient document conveyor and gripper is embodied, and in which a more efficient and serviceable copying camera is combined having positive and safe film handling features including a variable speed driving means. It is a further object of the invention to provide the mentioned and other improvements in a copying apparatus of the type stated which is generally more compactly and efficiently arranged than such devices heretofore provided.

With the foregoing and other objects in view, there is provided in an illustrative embodiment of the present invention a rectangular cabinet having positioned at one side thereof document conveying and mirroring means and at the other side a copying camera and main driving mechanism adapted to constantly drive a disc type shutter for the camera and to intermittently drive the conveying means and the camera, these elements being so synchronized that when the shutter is in a position to expose film, the document conveyor and film feed are at rest and when the shutter is making the balance of its cycle cutting off light from the film, the conveyor is driven to advance another document into the photographic field of the camera and the camera is driven to present a fresh length of roll film to exposure position.

The conveyor means is embodied as a pair of endless chains having document bars arranged therebetween and grippers combined therewith to automatically engage the leading edge of a document presented thereto by feeding the document through a slot in the horizontal top of the cabinet. The conveyor thus engages the document in a horizontal reach at the top of the cabinet and carries the document through a vertical reach between a pair of transparent plates flanked on either side by a mirror in an angular position, the mirrors occupying the photographic field of the camera and exposing both the front and rear of the document for copying on the film. The conveyor thereafter carries the document in a horizontal reach at the bottom of the cabinet where the document is automatically released into a tray for removal, and the conveyor continues through another vertical reach to its upper horizontal reach where incoming documents are received.

The copying camera is arranged externally at one side of the cabinet and adjacent the camera within the cabinet are means for continuously driving a disc shutter for the camera and Geneva gearing means for intermittently driving the conveyor and camera. The camera is provided with an adjustable mask for taking either or both sides of a document, a safety shutter to close the camera automatically in case of absence of a document, a variable speed film pull down drive easily adjustable to vary the length of unexposed film moved to exposure position and automatically rendered inoperative in the absence of a document in the conveyor, and a film pressure plate cam actuated by the shutter to hold the film during exposure and release it for advance thereafter.

It will be understood that the foregoing general description and the following detailed description as well are exemplary and explanatory of the invention but are not restrictive thereof.

Referring now in detail to the illustrative embodiment of the invention shown by way of example in the accompanying drawings, and adverting first to the general arrangement of the various elements of the copying apparatus as shown in Fig. 1 of the drawings, there is provided a rectangular cabinet 15 on one end wall of which is removably and externally mounted a document copying camera designated generally by the numeral 16. At the other end of cabinet 15 are provided the document feed and conveying means for carrying a document through the photographic field of camera 16. As shown the cabinet is provided with a convenient drop-leaf platform 17 on which documents may be stacked and manually pushed forward to an inclined panel or table 18 directed beneath the top 19 of the cabinet, and from the forward edge of panel 18 the document is positively engaged by the chain conveyor mechanism hereinafter described. The conveyor carries the document downwardly between a pair of vertically arranged transparent plates 20 and 21 which are suitably fixed to the cabinet walls, the plates serving to flatten the successive documents for photographing. Mirrors 22 and 23 are angularly positioned with respect to plates 21 and 20 respectively converging thereon at the edges of the plates away from camera 16. The mirrors 22 and 23 lie in the photographic field of camera 16 and reflect the front and rear surfaces of a document positioned between plates 21 and 20, and, as hereinafter fully explained and described, the camera is provided with adjustable masking means so that either surfaces may be photographed without the other or both surfaces may be photographed simultaneously. A pair of lights 24 and 25 are preferably positioned at the top of the cabinet between plates 20, 21 and mirrors 22, 23, and mirrors 26 are positioned at the bottom of the cabinet between those elements. Another pair of lights 27 and 28 are placed at the top of the cabinet and their beam is directed toward the document exposure position between plates 20, 21.

A control panel 29 is preferably positioned in the horizontal top of cabinet 15 to conveniently position the several control switches and indicating means provided for the copying apparatus. In the portion of cabinet 15 beneath panel 29 is located the driving means for the camera and document conveyor, as will now be discussed.

*Main Driving Mechanism.*

The driving mechanism for the copying apparatus is shown in Figs. 1A to 6 inclusive of the drawings and comprises an electric motor 30 driving by means of a belt connection any conventional and suitable reduction gearing unit 31, through which is driven by belt 32 a pulley 33 on shaft 34 which is mounted by anti-friction bearings in a stationary framework 35. The pulley 33 is provided with a pin 36 on one side for continuously driving the camera shutter as hereinafter described, and through shaft 34 drives the eccentric driving member 37 of a Geneva driving unit. The driven member 38 of the Geneva drive is carried on a shaft 39 mounted on anti-friction bearings in the framework portions 40 and 35, and drives by peripheral teeth meshed with gear 41 a shaft 42 from which the intermittent drive for the conveyor and camera are taken.

As shown in detail in Fig. 4 of the drawings, the shaft 42 is mounted by suitable anti-friction bearings in a journal 43 which is a part of the framework for the driving mechanism, and it has at one end a universal connection 44 with a drive shaft 45 leading across the cabinet to the conveyor mechanism. At its other end shaft 42 carries an eccentrically mounted pin 46 which provides a removable connection with the camera driving mechanism.

*Camera*

As shown in Fig. 2 of the drawings the camera 16 for the copying apparatus comprises a generally rectangular casing which is adapted to be removably positioned in an aperture 51 in the side of the cabinet by means of bolts 52 and a light gasket 53 is positioned around the aperture and engages the camera casing. The camera casing 50 has extensions 54 and 55 on its rear wall to house driving and braking mechanism for the film in any suitable film magazine 56. The magazine is removably secured to the rear wall of the camera and is supported in part by a portion of the housing 57 which is positioned between the extensions 54 and 55.

As best shown in Fig. 10 of the drawings the shutter 58 of the camera is in the form of a disc having an interrupted peripheral portion 59 designed to register with the exposure aperture 60 for the film and the customary lens 61, and the shutter is carried by a shaft 62 mounted by means of suitable anti-friction bearings in the front wall of the camera casing 50. The shaft 62 at its outer end carries disc 63 beyond the casing, having a peripheral interruption 64 to receive the pin 36 on pulley 33, whereby the shutter disc is connected for constant drive while the camera is in operation and the drive is easily separated when the camera is to be removed from the cabinet.

A similar easily separable driving connection is established for the intermittent drive to the film in the camera, and as embodied comprises the pin 46 which is received in the interrupted periphery of a disc 66 on shaft 67, which is the main drive shaft for the film drive of the camera.

As best shown in Fig. 11 of the drawings, the shaft 67 extends through the width of the rectangular camera casing 50 and is mounted for rotation by suitable anti-friction bearings in the front and rear walls of the casing and in an intervening frame portion 68. The shaft extends into the rear casing extension 55 where a drive is established for the take up reel in the magazine, as will hereinafter be disclosed.

A variable and adjustable speed drive is provided between the intermittently driven shaft 67 and the various driven film engaging rollers of the camera. As embodied this drive comprises a drive disc 69 (Fig. 10) mounted by means of its shaft 70 in suitable anti-friction bearings in the rear wall of casing 50, and a peripheral bearing surface 71 is also provided for the disc to cooperate with an annular thrust bearing surface 72 and an interposed anti-friction bearing ring 73.

The variable speed drive disc 69 is peripherally toothed and meshes with an idler gear 74 which is in turn in mesh with a gear 75 secured to shaft 67 and driven thereby. The variable speed drive take-off from driven disc 69 comprises a follower wheel or roller 76 to engage the surface of the disc, and the wheel 76 may be positioned as desired along a radius of the disc to vary the angular rotation of the wheel with respect to the angular rotation of disc 69 and thus vary as desired the length of film pull down.

Wheel 76 (Figs. 7 and 9) is mounted by means of a splined connection to rotate with and drive a vertically arranged shaft 77, which is mounted at its upper end by an anti-friction bearing in a horizontally extending internal wall 78 of casing 50. Shaft 77 is further mounted for rotation at the position of wheel 76 by means of an anti-friction bearing between the wheel and a yoke 79 which is adapted to position the wheel along a radius of disc 69.

As shown, the yoke 79 is formed with an integral sleeve portion 80 which carries a rack gear 81 and has a splined connection with a vertically arranged shaft 82 mounted for limited rotary motion by means of anti-friction bearings in the internal wall 78 and the lower wall of casing 50. An adjusting shaft 83 mounted in bearings in a side wall of the casing and a journal 84 is provided with a gear 85 at its inner end to engage rack 81, whereby the position of follower wheel 76 may be varied by rotation of shaft 83. The adjustment shaft is provided at its other end with a calibrated knob 86 whereby the film pull down may be minutely adjusted, and the dial preferably may be so calibrated as to indicate a setting for copying one side only of documents, or copying both sides simultaneously. Any conventional spring detent means 89 may be associated with shaft 83 whereby it may be conveniently located at definite positions. An arm 87 (Fig. 11) rigidly secured to shaft 82 adjacent its upper end is biased in one direction by a spring 88, and this force tends at all times to rotate shaft 82 in a direction to urge yoke 79 by means of its splined connection with sleeve 80 toward disc 69, thus carrying follower wheel 76 against the disc.

Means are provided for immediately interrupting and braking the film drive in the case where no document is present in the conveying mechanism to be photographed, and as embodied such means comprise a brake disc 90 (Fig. 10) secured to the lower end of shaft 77 and adapted to be peripherally engaged by the vertical arm of a lever 91 pivotally arranged on shaft 92. The horizontal arm of lever 91 is slotted to receive a pin 92' secured to the armature 93 of a solenoid 94 which is actuated as hereinafter explained when the document conveyor advances with no document in position to be photographed. A coiled spring 95 urges the lever 91 out of contact with brake disc 90. Actuation of the solenoid pivots lever 91 to engage brake disc 90, which immediately stops rotation of shaft 77 and likewise slightly displaces the shaft to carry follower wheel 76 away from the surface of disc 69, thus terminating further drive of the film pull down.

Returning now to the camera gear train whereby the film is intermittently advanced through the variable pull down just described, a pinion gear 96 is secured adjacent the top end of driven shaft 77 to drive gears 97 and 98 in mesh therewith. These gears are mounted by means of shafts with anti-friction bearings in the horizontal internal wall 78 of the camera casing (Fig. 9) and carry in the casing compartment above said wall the driven film guide rollers 99 and 100 respectively. Gears 101 and 102 are in mesh with gears 97 and 98 respectively, and these gears are similarly mounted on shafts to drive other guide rollers 103 and 104 respectively for the film. The shaft of gear 102 carries also a pinion gear 105 in mesh with a gear 106 driving a cam pin 107 to actuate a microswitch 108 every revolution of gear 106. The switch 108 is utilized to actuate a counter mechanism on the panel of the cabinet, and the gearing is preferably arranged so that the switch is actuated once for every foot of film driven around the driven rollers described, so that a constant record is kept of the footage of film expended from the supply roll.

Driving means are also provided for the film take-up reel in the magazine 56. As embodied such means comprise engaged bevel gears 110 and 111 driven from the main intermittent camera drive shaft 67 positioned in the casing extension 55 at the rear of the camera, to drive a pulley 112 at the top of the casing extension. The pulley is connected to drive the take-up reel by a spring belt 113 or other suitable equivalent means when the magazine 56 is in place on the camera, as shown in Fig. 2 of the drawings.

The film magazine 56 may be any suitable commercial construction and is removably secured to the back of the camera casing 50 by means of a screw 114 engageable in a threaded boss 115 (Fig. 10) in the back of the casing. Preferably the magazine is a Bell and Howell 400 foot, 16 m. m. magazine, and that type is shown in outline in the present drawings for use with the camera.

The film supply and take up is provided adjacent the central portion of the magazine 56 and the camera casing and magazine at this position have interfitting double shoulders as indicated at 116 and 117 to insure against light access to the film, as well as interfitting portions 118 and 119 to facilitate proper positioning of the magazine.

As best shown in Fig. 8 of the drawings, the lead of the film indicated in dot dash lines and designated by the letter F is from the supply side of magazine around an idler guide roller 120 and an idler guide roller 121 mounted on pivoted arm 122. The film then passes around driven rollers 99 and 103, past the exposure aperture 60 behind film gate 123, thence around driver rollers 104 and 100. The lead is then around an idler roller 124 pivotally mounted by means of an arm 125 and around an idler roller 126, from which it again enters the film magazine 56 to the take up reel for the exposed film. The pivotally mounted rollers 121 and 124 are spring urged by means of springs 127 and 128 respectively on arms 122 and 125 against the reaches of film F engaging them at their respective sides of the camera. In case of a film breakage in the camera the roller 121 or 124, depending on the location of the break, is adapted to be carried against a microswitch 130 or 131 to indicate a film break on the control panel and to terminate further drive of motor 39 as hereinafter described.

The control for the feed reel of the film in magazine 56 is similar to the take up reel control already described, there being a pulley 132 (Fig. 2) above the casing extension 54 which is to be connected to the supply reel of the magazine by means of a spring belt 133 or other suitable means. Pulley 132 is connected to rotate with a pulley 134 (Figs. 8 and 11) within the housing extension 54, and means are provided for exerting a braking effort on the latter pulley in order to prevent overtravel of the supply reel and to decrease the shock load on the film due to the intermittent drive. As embodied such means comprise a brake belt 135 secured to a stationary post 136, looped about the periphery of pulley 134, and connected to an arm 137 of a pivotally mounted lever 138. Another angularly positioned arm 139 of lever 138 is urged in a counterclockwise direction by means of a coiled spring 140 connected to post 136. The brake force is removed by rotation of lever 139 through a third arm 141 having a detent 142 engaged by pivoted arm 122 when said arm is held against the pull of its spring 127 and against the added pull of spring 140 of the film F. This condition is shown in Fig. 8 and is caused by pull of film F due to the acceleration of drive and the inertia of the film roll feeding the camera. At this position all braking is removed and when the film stops accelerating, the film starts to slacken permitting the arm 122 to return toward the switch. The arm is stopped short of the switch, however, because the brake arm coming back tightens the brake and the film stops the arm.

A pair of light gates 145 and 146 are slidably arranged in a guideway 147, each to adjustably mask a half of the exposure aperture 60. The gates are identically made and each comprises a rack portion 148 engaged by a pinion gear 149 on a shaft 150 journalled in a boss 151, under the control of a setting wheel 152. The setting wheels are preferably calibrated to show the closed or open positions of the light gates and may also be marked in such a way as to indicate which side of the document will be photographed by opening the individual gate.

An emergency light gate or safety shutter 153 is also provided under the control of a lever 154 pivoted at 155 and connected at its other end to the armature 156 of a solenoid 157. If no document is in place to be photographed the safety shutter 153 is actuated across aperture 60, solenoid 157 being normally energized but de-energized in such event, as will hereafter be described. The solenoid armature is spring biased to close the safety shutter when the solenoid is not energized.

Film gate 123 is mounted for automatic operation to grip the film at aperture 60 when the interrupted peripheral portion 59 of shutter 58 is in position to expose the film, and to release the film when the shutter closes the aperture and the film is to be advanced. As shown in Fig. 10, the film gate is carried by a plate 160 which is mounted for reciprocating movement on the internal casing wall 78, a coiled spring 161 tending to force the plate toward the front of the casing. Shutter disc 58 has a cam portion 162 engaged by follower 163 connected to plate 160, and the cam portion is relieved as indicated at 164 at a place registering with shutter aperture 59, so that spring 161 is enabled to move plate 160 and pressure plate 123 forward into holding engagement with the film when the exposure aperture 60 is uncovered and film exposure is taking place.

Pressure roller means are provided for cooperation with driven rollers 99 and 100 to positively control the film in the camera and means are combined therewith for allowing threading of the film in the camera when it is open, said means also cooperating with the pressure plate to allow positioning of the film at that place. Driven roller 100 is preferably made with a very slightly greater circumference than the roller 99 in order to keep the film in the camera taut at all times. As embodied there are provided a pair of anti-friction bearing mounted rollers 165 on shafts 166 and 167 extending vertically above and below respectively a carrier 168, and the carrier, and thus the rollers, are mounted for relative movement with respect to framework 169 on a shaft 170 which is urged toward the front of the carrier by spring 171. When the rollers are spring urged toward the front they are in a position to peripherally abut driven rollers 99 and 100 and grip the film therebetween, but may be retracted by the action of pivoted lever 172 which has a front depending arm 173 to engage the rounded end of shaft 170. The lever 172 is spring urged out of contact with shaft 170 by a leaf spring 174, but may be held in its contacting position, retracting the pressure rollers 165, by a depression in arm 173 to receive the end of shaft 170. The cover 175 of camera casing 50 is pivoted thereto at 176, has a spring catch at its opposite end as indicated at 177 (Figs. 7 and 9) and is adapted to engage and depress the rearward end of lever 172 when it is closed, if the lever is in its position engaging shaft 170 retracting rollers 165. It will thus be apparent that unless lever 172 is manipulated by hand to allow rollers 165 to move forward to engage the film prior to closing the cover 175, the action will be accomplished automatically when the cover is closed.

As shown in Fig. 10, the shaft 167 carrying lower roller 165 is extended downwardly into an aperture 178 in movable plate 160, so that retraction of rollers 165 by lever 172 also forces plate 160 rearwardly against spring 161, thus retracting the pressure plate so that film may be threaded thereby. A shoulder 179 on the rear end of lever 172 is also adapted to actuate a pin 180 extending into a suitable aperture in the Bell and Howell magazine 56, which serves to open the light traps provided in that type of magazine where the film leaves and reenters.

*Document conveyor*

Referring now in detail to the embodied document conveying means shown in Figs. 12 to 17 inclusive, there are provided a pair of endless chains 185 to travel around pairs of sprockets 186, 187, 188 and 189 mounted at either end of shafts 190, 191, 192 and 193 respectively, which are rotatably mounted in anti-friction bearings in the cabinet walls. As best shown in Fig. 1A, the conveyor chains receive an intermittent drive by the connection of shaft 45 through a universal joint 194 with shaft 190. The chains are steadied in their travel and prevented from whipping motion by pairs of guides 195, 196, 197 and 198 between which the chains travel in their various reaches.

Means are provided for automatically gripping the leading edge of a document in position at the top of the cabinet having been advanced by hand along the inclined feed table 18, and for automatically releasing the document along the bottom reach of the conveyor where it may fall into a removable tray. Such means include a plurality of bars 200 extending between duplicate rectangular frames 201 connected to chains 185 for travel therewith by means of pins 202 and 203. The bars 200 are rigidly secured to said frame and spaced apart along the chains each to receive the leading edge of a document D (Figs. 16 and 17) which is engaged or impaled thereon by wire or other sharply pointed fingers 204, the bars having rear edge interruptions 205 to receive the finger prongs if and when they impale the document.

As shown the pronged fingers 204 are carried by bars 206 carried by shafts 207 journalled in frames 201, said bars being rotatable from a position shown in Fig. 16 of the drawings to that shown in Fig. 17 to engage the document. The actuation means for rotatable bars 206 include cam wheels 208 on shafts 207 within frames 201. These wheels have inwardly projecting cam surfaces in the form of posts 209 to engage depending fingers 210 of brackets 211 secured to a stationary part of the cabinet and bring about rotation of bars 206 as the chains move forward. The bars 206 are maintained in open or closed position (referring to the relation of fingers 204 with respect to bars 200) and are given a rapid actuated motion by means of springs 212 extending between posts 213 on wheels 208 and bars 214 secured to frames 201.

Document positioning and stop means are provided in the form of a plurality of depending plates 215 secured to a part of the cabinet beyond the end of the inclined feed table, and the lower edges of the plates are centrally relieved as indicated by the numeral 216 to receive the ends of flexible arms 217 which extend thereto from the underside of the feed table, to which they are secured as by means of rivets 218.

It will now be clear that a document D may be advanced downwardly along the inclined feed table and beyond the end thereof, supported by arms 217, until the leading edge thereof engages the lower edges of plates 215, such position being shown in Fig. 16 of the drawings. When a bar 200 has advanced to a position beneath the forward portion of the document beyond the end of the feed table, the posts 209 are engaged by fingers 210, and the document is then engaged by pointed fingers 204. This engagement displaces downwardly the flexible arms 217 through the overlying document, and the document is then in a position to be moved forward with the conveyor beyond the lower edges of depending plates 215.

After the document has been carried through the front vertical reach of the conveyor for photographing, and is in the lower reach, a second cam post 219 on each wheel 208 is engaged by fingers 220 on brackets 221 secured to the cabinet. The bars 206 and pointed fingers 204 are thereby rotated back to the position shown in Fig. 16 releasing the document to fall into the tray for removal, and the bars retain their respective positions until another document is to be received along the top reach of the conveyor, as already described.

*Controlling means*

In Fig. 18 of the drawings there is diagrammatically illustrated the means for controlling the copying apparatus already described, including means for indicating the condition of the apparatus with respect to important functions and the number of documents which have been photographed. It will be noted that there is indicated in Fig. 18 by suitable legend which of the various elements of the control system are located on the operating or control panel 29, in the machine or cabinet 15, and in the camera 16, dot and dash lines being supplied in the diagram to show the location. Fig. 18 shows the control system in current off position.

As shown a power source is indicated as 230 with main lines 231 and 232 connected thereto. A motor switch 233 is provided on the operating panel 29 for starting and operating the motor 30 in the machine. Four lamp burnout relays 234, 235, 236 and 237 with their switches 238, 239, 240 and 241 are provided for the illuminating lights 24, 25, 27 and 28 respectively, and the switches mentioned are arranged in series in the motor circuit so that a failure of any one of the lamps will interrupt the circuit and stop the motor, prohibiting further operation in which imperfect exposures might be obtained. Each of the switches 234 to 237 is shown in lamp off position, and they are engaged with the opposite contacts when the machine is in operation and the lamps are burning. Also arranged in series in the motor circuit are the switches 130 and 131 already described (Fig. 8) as located in the camera to be actuated by a film break in the leads of film to and from the exposure position. The opening of either switch from the position shown, by reason of a film break, interrupts further operation and prevents spoiling of film and introduction of documents which cannot be photographed.

A pilot light 243 on panel 29 indicates that switch 233 is closed and the motor in operation. An indicating light 244 on the panel is lighted when either of the switches 130 and 131 is engaged with the opposite contact to the position shown in Fig. 18 upon a film break occurring.

The circuit for the illumination lamps 24, 25, 27 and 28 is closed by a switch 245 on the control panel and the circuit includes, in addition to the lamp burnout relays already referred to, a transformer 246, a variable resistance unit 247 on the operating panel for setting the brightness of the illumination lamps, a voltage regulator tube 248 (such as type VR150) and a voltmeter 249, also on the panel, for indicating the brightness setting for the lamps.

A pilot light 250 on the operating panel is lighted when light switch 245 is closed and the illumination lights are on. A lamp burnout indicating light 251 is also positioned on the operating panel the circuit of which includes a parallel arrangement of the relay switches 238 to 241 inclusive, and the motor switch 233, so that a burnout in any one of the illumination lamps brings about a switch contact in the position shown in Fig. 18 for the corresponding one of the switches 238 to 241 and lights the indicator.

Also provided on the operating panel is a footage counter 255 connected through motor switch 233 and cam operated switch 108 in the camera already described (Fig. 11). The counter may be set when a fresh magazine of film is put on the camera and a constant indication of film used is thus afforded, preventing accidental exhaust of the film supply.

Referring now to the camera drive and safety shutter control mechanism, the solenoid 94 (Figs. 9, 10 and 18) is controlled through a pair of switches 256 and 257 and the shutter solenoid 157 through a pair of switches 258 and 259, and the operation of each solenoid is dependent upon a document sensing switch 260. Likewise dependent upon the position of the document sensing switch 260 is the operation of a document counter 261 on the operating panel and another counter 262 in parallel therewith which is preferably conveniently located adjacent the camera 16. The document counters 261 and 262 are connected through a document counter switch 263, sensing switch 260, and motor switch 233 with the main lines 231 and 232.

The pairs of switches 256, 257 and 258, 259, and the document counting switch 263 are mounted for cam actuation from a cam track 265 on the pulleys 33 (Figs. 3 and 5) in the main driving mechanism already described. As shown in Fig. 5, a yoke 266 is pivotally mounted at 267 on the driving mechanism framework and has a follower 268 bearing against track 265, spring 269 biasing the yoke and follower against the cam track. The switches 258, 259 and 263 are mounted in a single bank of three designated by the numeral 270 in Fig. 5 and are normally in free position until actuated by the movement of yoke 266 with individual set screws 271, brought about by the rise in cam 265. The switches 257 and 256 are mounted in a bank of two switches designated 272 in Fig. 5 and are normally in free position until actuated by individual set screws 273 on yoke 266, brought about by drop in cam 265. The one of the three set screws 271 which actuates switch 259 is set closer to the switch than the set screw which actuates switch 258. This causes switch 259 to be actuated first and return to normal later than switch 258. The arrangement is similar on switch group 272 where operation of switch 256 is set to overlap switch 257. Switches 263 and 259 are normally open and switch 258 is normally closed. Switch 256 is normally open and switch 257 is normally closed. The document sensing switch 260, as shown in Fig. 12, is mounted with an arm extending into the path of the document feed to close the switch, that is, make the opposite contact to that shown in Fig. 18, when a document is resting at the station proceeding photographing position and as it approaches a position to be photographed.

The cam track 265 is so positioned with respect to pulley 33 and the other driving mechanism described for the shutter, camera and document conveyor that the switches 258 and 259 (and 263 as well) are actuated and then returned to normal before the disc shutter 58 arrives at a position to expose film at its peripheral interruption 59, and the switches continue in this position until the shutter has continued beyond its exposing position. During the exposure time the switches 256 and 257 are in actuated position and at normal position through the rest of the cycle.

It will, therefore, be apparent that when the copying apparatus is in operation and a document is in place in the conveyor and approaching a position to be photographed, switch 260 will make the opposite contact to that shown in Fig. 18, switch 259 will at that time be closed, and the solenoid 157 will be energized to retract the safety shutter 153 to allow photographing to take place, switch 258 being open. When solenoid 157 is energized, its holding switch 280 is closed, and as operation continues and switch 259 opens, switch 258 will be closed to energize the solenoid through switch 280 and a resistance 281, holding the safety shutter in retracted position. If, however, in a subsequent cycle of the apparatus a document is not in position in the conveyor approaching the place to be photographed, the holding circuit will be broken by switch 258, and the circuit through switch 259 will not be established through switch 260, the solenoid 157 will be de-energized, and the safety shutter closed.

Referring now to the camera drive circuit, the solenoid 94 is normally de-energized to allow film pull through, and is energized to remove wheel 76 from drive disc 69 and simultaneously brake further film drive. If a document is in place and switch 260 is on the opposite contact to that shown in Fig. 18, solenoid 94 is de-energized and drive of the camera can take place, switch 256 being open during the drive portion of the cycle. If, however, a document is not in place, solenoid 94 is energized through switches 260 and 256. When solenoid 94 is energized, switch 282 is closed, so that as switch 257 becomes closed, a holding circuit through resistance 283 is established and the solenoid continued in its energized condition even when switch 256 is opened. There is thus no further camera drive and film advance until a document has changed the position of switch 260 and broken the circuit to solenoid 94, and the camera is in a position to be driven for film feed during the next succeeding drive portion of the cycle. A switch 284 on the operating panel in the circuit of solenoid 94 is kept closed during normal operation of the apparatus so that the automatic camera drive termination and braking may be effected, but the switch may be opened when desired so that camera drive may take place regardless of whether or not documents are moving through.

The switch 263, as already stated, is closed with the actuation of switches 258 and 259 before the film exposure portion of the operating cycle, and if a document has changed the position of switch 260, the circuit to the counters 261 and 262 is closed for counting the document, while if switch 260 remains unchanged by reason of the absence of a document, the counters are not actuated.

The invention in its broader aspects is not limited to the specific mechanisms shown and described but departures may be made therefrom, within the scope of the accompanying claims, without departing from the principles of the invention and without sacrificing its chief advantages.

What is claimed is:

1. In a document copying apparatus a camera having a disk shutter and film advancing rollers, document conveying means for carrying a document through the photographic field of said camera, continuous power means, intermittent drive power transfer means connected to said power means, means interconnecting said shutter to said power means and said conveying means to said power transfer means, means interconnecting said film advancing rollers and said power transfer means including means for varying the driven speed of said rollers, said last means comprising a driving disk connected to said power transfer means and a driven wheel connected to said rollers to peripherally engage a radial surface of said driving disk and means for varying the radial engagement of said driving disk and wheel, and means for automatically disengaging said driving disk and wheel when said conveying means is not carrying a document toward said photographic field said means including document sensing means in the path of documents moving toward said photographic field operably connected with means for moving said driving disk and wheel relatively apart.

2. In a document copying apparatus a camera having a disk shutter and film advancing rollers, document conveying means for carrying a document through the photographic field of said camera, continuous power means, intermittent drive power transfer means connected to said power means, means interconnecting said shutter to said power means and said conveying means to said power transfer means, means interconnecting said film advancing rollers and said power transfer means including means for varying the driven speed of said rollers, said last means comprising a driving disk connected to said power transfer means and a driven wheel connected to said rollers to peripherally engage a radial surface of said driving disk and means for varying the radial engagement of said driving disk and wheel, and means for automatically disengaging said driving disk and wheel and braking said film advancing roller when said conveying means is not carrying a document toward said photographic field said means including document sensing means in the path of documents moving toward said photographic field operably connected with means for moving said driving disk and wheel relatively apart and means for braking said film advancing roller.

3. In a document copying apparatus a camera having film forwarding rollers, document conveying means for carrying a document through the photographic field of said camera, variable speed drive means for said forwarding rollers comprising a driven wheel geared thereto and a driving disk having a radial face to be engaged by said driven wheel, carrying means in which said driven wheel is journalled for free rotation, means for moving said carrying means along a radius of said driving disk, resilient means engaging said carrying means urging said driven wheel toward engagement with said driving disk, and means for automatically disengaging said driven wheel from said driving disk when said conveying means is not carrying a document toward said photographic field, said means including document sensing means in the path of documents moving toward said photographic field operably connected with means for moving said driven wheel and driving disk relatively apart.

4. In a document copying apparatus a camera having film forwarding rollers, document conveying means for carrying a document through the photographic field of said camera, variable speed drive means for said forwarding rollers comprising a driven wheel geared thereto and a driving disk having a radial face to be engaged by said driven wheel, carrying means in which said driven wheel is journalled for free rotation, means for moving said carrying means along a radius of said driving disk, resilient means engaging said carrying means urging said driven wheel toward engagement with said driving disk, and means for automatically disengaging said driven wheel from said driving disk and braking said driven wheel when said conveying means is not carrying a document toward said photographic field, said means including document sensing means in the path of documents moving toward said photographic field operably connected with means for moving said driving disk and wheel relatively apart and means for braking said driven wheel.

5. In a document copying apparatus, a camera having a disk type shutter and film forwarding rollers, document conveying means for carrying a document through the photographic field of said camera, means for continuously driving said shutter, means for intermittently driving said conveying means and said film forwarding rollers, means for interrupting the drive of said film forwarding rollers, other shutter means for said camera independent of said disk type shutter, actuating means for closing and opening said other shutter means and means for automatically closing said other shutter means and interrupting the drive of said film forwarding rollers when said conveying means is not carrying a document toward said photographic field, said means including document sensing means in the path of documents moving toward said photographic field operatively connected with said interrupting means and said other shutter actuating means.

6. In a document copying apparatus of the intermittent type, a camera having an exposure aperture, shutter means for intermittently covering and uncovering said aperture, means for intermittently moving film past said aperture said means being at rest when said shutter means uncovers said aperture, conveyor means for intermittently moving a document into the photographic field of said camera, said means being at rest when said shutter means uncovers said aperture, safety shutter means, means for actuating said safety shutter means to cover said aperture when said shutter means is about to uncover said aperture and no document is present on said conveyor means in the photographic field of said camera and means for maintaining said safety shutter means over said aperture until a document is present on said conveyor means to be photographed said safety shutter actuating and maintaining means including document sensing means in the path of said conveyor means.

JOHN HALAHAN.
FLOYD A. LYON.
LYNN H. MORTIMER.
THEODORE F. ARONSON.

(References on following page)

REFERENCES CITED

The following references are of record in the file of this patent:

UNITED STATES PATENTS

| Number | Name | Date |
|---|---|---|
| 1,204,098 | Watson | Nov. 7, 1916 |
| 1,406,665 | Ljungstrom | Feb. 14, 1922 |
| 1,900,878 | Hopkins | Mar. 7, 1933 |
| 1,939,446 | Hessert | Dec. 12, 1933 |
| 1,966,348 | Hughey | July 10, 1934 |
| 1,969,465 | Jones | Aug. 7, 1934 |
| 2,001,596 | Caps | May 14, 1935 |
| 2,099,681 | Draeger | Nov. 23, 1937 |
| 2,177,135 | Fassel | Oct. 24, 1939 |
| 2,185,529 | Sullivan | Jan. 2, 1940 |
| 2,201,009 | Oiler | May 14, 1940 |
| 2,209,342 | Loughridge | July 30, 1940 |
| 2,219,458 | Sohns | Oct. 29, 1940 |
| 2,235,844 | Nelson | Mar. 25, 1941 |
| 2,291,006 | Stuart | July 28, 1942 |
| 2,292,825 | Dilks | Aug. 11, 1942 |
| 2,335,439 | Nerwin | Nov. 30, 1943 |
| 2,371,542 | Place | Mar. 13, 1945 |
| 2,377,525 | Schutt | June 5, 1945 |
| 2,391,274 | Schubert | Dec. 18, 1945 |
| 2,411,694 | Place | Nov. 26, 1946 |
| 2,435,099 | Pratt | Jan. 27, 1948 |
| 2,476,677 | Merritt | July 19, 1949 |
| 2,478,641 | Rose | Aug. 9, 1949 |